3,244,006
FILM COOLED COMBUSTION PRESSURE TRANSDUCER

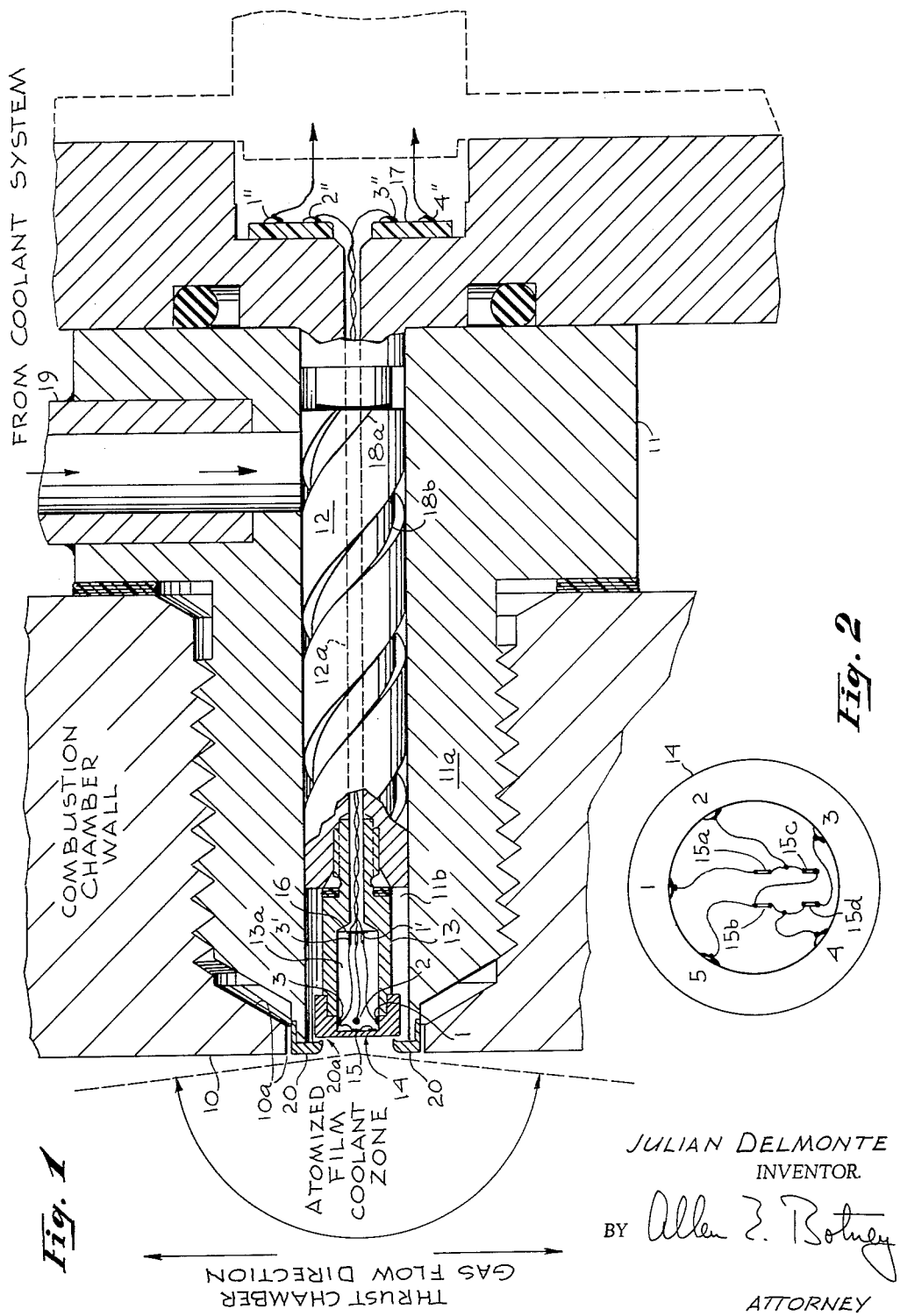

Julian Delmonte, La Canada, Calif., assignor to Electro-Optical Systems, Inc., Pasadena, Calif.
Filed Apr. 19, 1963, Ser. No. 274,252
7 Claims. (Cl. 73—398)

The present invention relates in general to pressure transducers and more particularly relates to a pressure transducer for measuring pressures in combustion chambers.

It is oftentimes necessary to accurately measure the pressures that exist inside a combustion chamber. However, it has always been a difficult problem to do so and it has become an increasingly difficult and complex problem to resolve with the advent of the jet, space and atomic ages. In connection with the combustion chamber of a rocket, for example, there exists an environment of extremely high temperature transients, large doses of shock and vibration input, surrounding changes of mechanical stress, thermal gradients, high electrical and acoustical noise fields, etc. Consequently, it has become extremely difficult if not impossible to really know what is being measured and, having recorded the same, to know what degree of accuracy the reading has attained. Accordingly, there has developed a dire need for a pressure transducer that will respond faithfully over long periods of time notwithstanding the fact that it is subject to the extreme conditions encountered in the region of combustion phenomena.

The present invention fulfills such a need in that it is capable of presenting a far truer pressure pattern than earlier transducer mechanisms of this type, and it can do so because of the particular construction and arrangement of the pressure-sensing device used and the manner in which the sensor device is cooled to avoid its destruction or deterioration by the high temperatures normally encountered in combustion chambers. More particularly, in an embodiment of the invention, the pressure sensing device is mounted so as to be flush with the inner wall of the combustion chamber and is cooled by a high velocity and low mass fluid flow that keeps the sensor at a temperature that is well within its normal operational range. The sensor device basically includes what is known as a clamped diaphragm, on one side of which are mounted four solid-state strain gauge elements interconnected in a Wheatstone bridge arrangement. When subjected to stress, either tension or compression, the resistivity and, therefore, the overall resistance of these elements change due to what is known as the piezoresistance effect, thereby producing an unbalance in the bridge that can easily be measured. Consequently, a measure of the bridge unbalance is also a measure of the pressures encountered in the combustion chamber. To effectively cool the diaphragm and the elements thereon, a coolant fluid is spiraled at high speed toward a very narrow air gap surrounding the periphery of the diaphragm. As a result, the liquid is vaporized as it emerges from the gap into the combustion chamber to form an atomized film coolant zone that protects the diaphragm apparatus.

Combustion pressure transducers that incorporate the features of the present invention offer several unique advantages over the prior art transducers. Presently used pressure transducers are internally cooled and, therefore, are only of modest accuracy because of the additional structural complexity and the turbulence caused by the relatively large mass of the coolant. More specifically, such units inherently have a low-frequency response, result in a substantial amount of hysteresis and are non-linear in nature. In the present invention, since the flush diaphragm is clamp designed, it responds to uniformly distributed pressures by deflecting extremely linearly within its designed range. Moreover, full scale pressures cause excursions of less than one-thousandth of an inch. Thus, the single degree of freedom spring system has a sharp natural frequency peak that is normally greater than one hundred kilocycles and is normally insensitive to G-loads along axes that are perpendicular to the pressure axis. Characteristically, the linearity of pressure versus output is better than three tenths of one percent of full scale, hysteresis is less than one quarter of one percent of full scale, and unamplified output, using the four solid-state strain gauge elements, is approximately 200 millivolts D.C. From these statistics it will be seen that an embodiment of the present invention is capable of responding faithfully and in phase to the high-frequency oscillations occasioned by the shock fronts generated by combustion phenomena.

Furthermore, in accordance with the present invention, the sensor device is externally cooled rather than internally cooled as in earlier transducer mechanisms. As mentioned previously, this is accomplished by means of a high-velocity fluid film, which thereby eliminates the turbulence that has proved to be so troublesome in the past. Thus, by means of the present invention, pressure transducers can be reduced to an ultraminiature size and used confident in the knowledge that the output is substantially free of distortion.

It is, therefore, an object of the present invention to provide a pressure transducer that will accurately measure the pressures encountered in combustion chambers.

It is another object of the present invention to provide a pressure transducer that can be used to accurately investigate combustion instability problems.

It is a further object of the present invention to provide a pressure transducer for combustion chambers that is of small size and light weight but highly reliable over a long period of time.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawing is for the purpose of illustration and description only and is not intended as a definition of the limits of the invention.

FIGURE 1 is a cross-sectional view of a preferred embodiment of the present invention; and FIGURE 2 illustrates the sensor portion of the FIG. 1 embodiment.

Referring now to the drawings, a combustion chamber wall 10 is shown through which a hole 10a has been made for the purpose of receiving the pressure transducer of the present invention. For this reason, hole 10a is internally threaded except for the innermost part of the hole that is, that portion of it that enters upon the combustion chamber itself, which tapers down to an opening of rather small diameter that may be only a fraction of an inch.

A transducer is shown mounted on wall 10 by being screwed into hole 10a, the transducer comprising a housing or casing 11 that has a threaded nose portion 11a that screws into the hole, the above-said nose portion being dimensioned to fit snugly. Casing 11 has a cylindrically-shaped hole or bore 11b running along its axis for its full length, a rod or shaft-like member 12, to which a housing 13 that houses the pressure-sensing device is fastened at the combustion chamber end, being tightly fitted into the more forward portion of the bore.

Housing 13, which is rigidly mounted on the end of member 12 and, therefore, for all practical purposes may be said to be integral with it, is also cylindrically-shaped but of smaller diameter than bore 11b. Consequently, a cylindrically-shaped volume of space or gap of annular cross-section exists around housing 13, the reason for which will be more fully understood later. Housing 13 has a cylindrically-shaped chamber 13a hollowed out within it which tapers down and meets with a narrow tube-like hole or bore 12a that runs through the length of member 12 along its axis.

Mounted over the combustion chamber end of housing 13 and, therefore, forming the end wall of chamber 13a, is a clamped diaphragm 14 the properties of which are set forth on pages 55 and 56 of the text entitled Theory of Plates and Shells by S. Timoshenko and S. Woinowsky-Krieger, 2nd edition, published in 1959 by McGraw-Hill Book Co., Inc., New York. Suffice it to say, therefore, that diaphragm 14 is U-shaped and has its arms or sides tightly fitted or clamped over the sides of housing 13, with the result that the center portion of the inside surfaces of the diaphragm's base, that is, the surface facing chamber 13a, is in tension whereas the outermost portions of this surface are in compression when pressure is externally applied to the diaphragm.

On the abovesaid inside surface of the diaphragm base are mounted four solid-state strain gauge elements interconnected to form a Wheatstone bridge type of network, as is shown by the view of the surface presented in FIG. 2. Two of the elements, designated 15a and 15b are mounted toward the center of the diaphragm surface whereas the other two elements, designated 15c and 15d, are mounted toward the outer regions of the surface. The solid-state strain gauge elements used herein are constructed of semiconductor materials, such as silicon, and complete information concerning such elements, both as to their construction and operation as well as their use in a bridge network may be obtained from the patent to William V. Wright, Jr., entitled Electrical Strain Transducer, No. 3,049,685, issued August 14, 1962. Suffice it to say, therefore, that the overall resistance of these elements change according to whether they are put in tension or compression by forces applied to the surface on which they are mounted.

Also mounted on the inside of clamped diaphragm 14 are a plurality of five terminals and these are designated 1–5. Elements 15a–15d are electrically connected to terminals 1–5. More specifically, one end of element 15a is connected to terminal 1, the other end of this element being connected to both an end of element 15c and terminal 2. Similarly, one end of element 15b is connected to terminal 5, its other end being connected to both an end of element 15d and terminal 4. Finally, the other ends of elements 15c and 15d are respectively connected to terminals 5 and 3. As is shown in FIG. 1, terminals 1–5 are connected by means of wires or leads to a second set of five terminals 1'–5' mounted on a base 16 which is firmly lodged in position at the other end of chamber 13, that is, at that end which faces diaphragm 14. From base 16, another set of five wires runs through opening 12a to another base 17 on which are mounted still another set of five terminals 1"–5", the wires respectively interconnecting terminals 1'–5' and 1"–5". From terminals 1"–5", connection is made to external circuitry as may be required, such as to an amplifier. It is thus seen that the several points in the bridge network of elements 15 are brought out to terminals 1"–5" and thereby made accessible.

Cut into shaft-like member 12 along its outer surface are two shallow helical grooves 18a and 18b, one groove being displaced from the other by 180°. At the input end of these grooves, they couple to a hollow tube 19 whereas at their output end they couple to space 11b surrounding housing 13. Thus, any fluid flowing through tube 19 enters grooves 18a and 18b and thereafter spirals through them to emerge in the space around housing 13. As mentioned above, grooves 18a and 18b are shallowly cut so that the fluid moving through them is of small mass.

The transducer finally includes a cap that extends from the end of nose portion 11a, to cover diaphragm 14, the cap having an annular baseplate 20 whose inner edge overlies the outer edge of diaphragm 14 and curves downward toward the diaphragm to form a very narrow air gap 20a with it. By way of example, an air gap may be formed that is between 0.001 and 0.002 inch across. As can be seen from the drawing, the cap is mounted so that the top or outer surface of its baseplate 20 is flush with the inner surface of the combustion chamber wall.

In considering the operation, it will be assumed that a threaded hole has been provided through the wall of the combustion chamber and that the transducer has already been screwed into it in the manner shown in FIG. 1. Accordingly, to measure the combustion chamber pressures, a fluid coolant, such as water, is forced to flow through tube 19 and spiral grooves 18a and 18b at high speed. By way of example, if water is used as the coolant, the water may be under a pressure of 1000 p.s.i. and approximately one gallon of water per minute will flow through the tube. The helical grooves produce a rifling effect upon the water, with the result that when the water leaves the grooves and enters space 11b surrounding housing 13 is continues to spiral as it advances toward air gap 20a. Upon reaching the air gap, the water passes through it into the combustion chamber, but in so doing the water becomes vaporized, thereby forming an atomized film coolant zone on the combustion chamber side of the transducer that protects the several important component parts of the transducer.

As for the pressures generated in the combustion chamber, these cause the center portion of diaphragm 14 to flex inwardly toward chamber 13a. Consequently, in accordance with the nature of clamped diaphragms, solid-state strain gauge elements 15a and 15b are placed in a state of tension while elements 15c and 15d are placed in a state of compression. Hence, as previously explained, the resistances of these elements are thereby changed, the unbalance in the bridge network thusly created being measurable at terminals 1"–5" and providing an accurate measure of the pressures involved.

Two points should be mentioned at this time with respect to diaphragm 14 and the coolant flow. More specifically, since the coolant may exert pressures against the sides of the diaphragm as it passes by and thereby produce some degree of flexing of the diaphragm which, in turn, would introduce error into the transducer output, the sides of diaphragm 14 are made extra thick as is clearly shown in the figure. By so doing, the diaphragm is not responsive to the pressure of the coolant. Furthermore, when the coolant passes through air gap 20a, due to the spiraling and forward momentum of the coolant, it is "lifted" away from the diaphragm surface and thereby avoids exerting any pressures against it. For the reasons mentioned, it is seen that the transducer is quite accurate.

Although a particular arrangement of the invention has been illustrated and described above by way of example, it is not intended that the invention be limited thereto. Accordingly, the invention should be considered to include any and all modifications, alterations or equivalent arrangements falling within the scope of the annexed claims. Thus, the coolant may be either a liquid or a gas. Water was mentioned as a possible liquid coolant whereas helium is an example of a possible gas coolant. In this regard, it should be noted that the width of air gap 20a is related to the type of coolant used. Thus, the air gap width specified earlier of between 0.001 and 0.002 inch is suitable for water as a coolant but where gas is used an air gap of even narrower width may be used. On the other hand, if a liquid coolant other than water is utilized and one that is more viscous than water, a larger air gap may be required. The criteria is such that the air gap should produce vaporization where a liquid coolant is used. Finally, it should be mentioned that a diaphragm other than a clamped diaphragm may be adapted for use in the transducer. One such other type of diaphragm arrangement is illustrated in the above-cited patent to William V. Wright.

Having thus described the invention, what is claimed is:

1. A pressure transducer for accurately measuring the pressures encountered in combustion chambers, said transducer comprising: a clamped diaphragm; apparatus for mounting said clamped diaphragm so that one surface thereof is exposed to the combustion chamber; a plurality of four strain gauge elements interconnected to form a bridge network mounted on the other surface of said diaphragm; an annular-shaped cap device fitted over said diaphragm and contiguous thereto, said device being formed to provide a narrow air gap between it and said diaphragm near the edge thereof; and means for propelling a spiralling coolant liquid into the space around said diaphragm and forward through said air gap, whereby said coolant liquid is vaporized to form an atomized film coolant zone inside the combustion chamber that protects the transducer components.

2. The transducer defined in claim 1 wherein said means includes a tube through which said coolant liquid is forced under pressure; and a member having a helical channel that couples between the exit end of said tube and the space around said diaphragm.

3. A pressure transducer for accurately measuring the pressures encountered in combustion chambers, said transducer comprising: a casing having a cylindrically-shaped bore therethrough; a shaft tightly fitted into said bore and having a helical groove cut into its surface, said shaft and said casing enclosing said groove to form a helical channel; a hollow tube extending through said casing and coupling with said helical channel at one end thereof; a cylindrically-shaped housing mounted in said bore on the end of said shaft, said housing being of smaller diameter than said bore to form a cylindrically-shaped space between said housing and said casing that couples with the other end of said helical channel; a clamped diaphragm mounted on the free end of said housing; a plurality of four strain gauge elements interconnected to form a bridge network mounted on the inner surface of said diaphragm; and a cap device fitted over said diaphragm and contiguous thereto, said device being formed to provide a narrow air gap between it and said diaphragm.

4. The transducer defined in claim 3 wherein said air gap is between 0.001 and 0.002 inch wide.

5. The combination comprising: a combustion chamber with a wall thereof having a small threaded hole therethrough; and a transducer for measuring pressures generated in said combustion chamber, said transducer including a casing having a cylindrically-shaped bore therethrough, said casing having a threaded portion for mounting said transducer in said hole so that said bore opens into said combustion chamber, a shaft tightly fitted into said bore and having a shallow helical groove cut into its surface, said shaft and said casing enclosing said groove to form a helical channel, a hollow tube extending through said casing and coupling with said helical channel at one end thereof, a cylindrically-shaped housing mounted in said bore on the end of said shaft, said housing being of smaller diameter than said bore to form a cylindrically-shaped space between said housing and said casing that couples with the other end of said helical channel, a clamped diaphragm mounted on the free end of said housing, a plurality of four strain gauge elements interconnected to form a bridge network mounted on the inner surface of said diaphragm, a cap device fitted over said diaphragm and contiguous thereto, said device being formed to provide a narrow air gap between it and said diaphragm, and a coolant liquid flowing at high speed through said tube, said helical channel, said space around said housing, and through said air gap into said combustion chamber.

6. The transducer defined in claim 5 wherein said strain gauge elements are made of semiconductor materials.

7. A pressure transducer for accurately measuring the pressures encountered in combustion chambers, said transducer comprising: a diaphragm rigidly held around its periphery; a plurality of four semiconductor strain gauge elements interconnected to form a bridge network mounted on one surface of said diaphragm, two of said elements being positioned to experience tension and two of said elements being positioned to experience compression when said diaphragm is flexed; first means for mounting said diaphragm so that its other surface is substantially flush with the inner surface of the combustion chamber wall; a cap device mounted over said diaphragm and contiguous thereto, said device being formed to provide a very narrow air gap between it and said diaphragm; and second means for propelling a coolant liquid at high speed around said diaphragm and through said air gap.

References Cited by the Examiner

UNITED STATES PATENTS

| 2,400,467 | 5/1946 | Ruge | 73—398 |
| 2,472,045 | 5/1949 | Gibbons | 73—88.5 X |
| 2,741,128 | 4/1956 | Gadd et al. | 73—398 |
| 3,049,685 | 8/1962 | Wright | 73—88.5 X |

LOUIS R. PRINCE, *Primary Examiner.*

S. FEINBERG, *Examiner.*

G. L. PETERSON, *Assistant Examiner.*